United States Patent [19]
Dor

[11] Patent Number: 5,339,464
[45] Date of Patent: Aug. 23, 1994

[54] UNIVERSAL ADAPTER FOR NIGHT VISION SYSTEM

[75] Inventor: Amotz Dor, Haifa, Israel

[73] Assignee: Litton Systems, Inc., Beverly Hills, Calif.

[21] Appl. No.: 912,835

[22] Filed: Jul. 13, 1992

[51] Int. Cl.$^5$ .......................... A42B 1/24; G02B 7/00; F16B 21/00

[52] U.S. Cl. .................................. 2/6.2; 2/6.6; 2/422; 224/181; 248/187; 248/222.1; 403/321; 403/326; 359/409; 359/815

[58] Field of Search ............... 359/407, 409, 410, 480, 359/630, 350, 815, 828; 250/330; 224/181; 2/6, 10, 421, 422, 438, 6.2, 6.6; 248/187, 222.1; 403/3, 4, 321, 326, 327, 329, 299; 128/206.27, 207.11; 354/286

[56] References Cited

U.S. PATENT DOCUMENTS

| | | | |
|---|---|---|---|
| 4,592,096 | 6/1986 | Glasheen | 359/409 |
| 4,697,783 | 10/1987 | Kastendieck et al. | 248/900 |
| 4,703,879 | 11/1987 | Kastendieck et al. | 224/181 |
| 4,809,942 | 3/1989 | Kastendieck et al. | 248/222.1 |
| 5,179,735 | 1/1993 | Thomanek | 359/815 |

Primary Examiner—William L. Sikes
Assistant Examiner—David R. Parsons
Attorney, Agent, or Firm—Poms, Smith, Lande & Rose

[57] ABSTRACT

An adapter is provided for enabling the use of night vision goggle having a plug-type mounting connector and a spring biased latch, with a head mounting assembly having a plate-type receiving carriage. The adapter comprises a housing having a plug-type receptacle which is configured to receive the plug-type mounting connector and a bar capable of engaging the latch. The adapter also comprises a mounting plate which is integrally formed to the hosing and configured to engage the plate-type receiving carriage. The plug-type mounting connector is secured within the plug-type receptacle by an engagement between the latch and the bar. The plug-type mounting connector is capable of selective disengagement from the plug-type receptacle by manual manipulation of the latch.

17 Claims, 3 Drawing Sheets

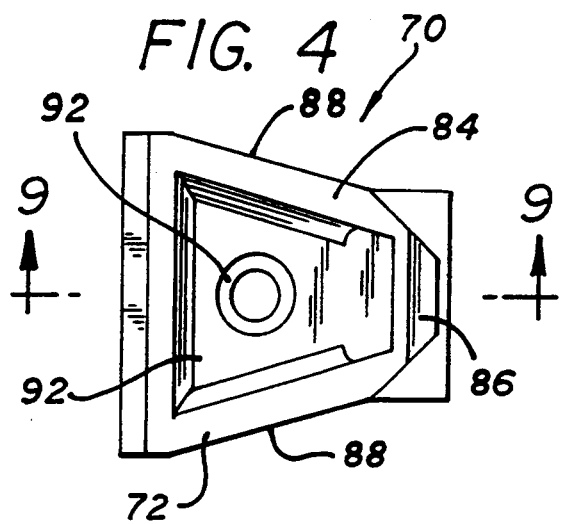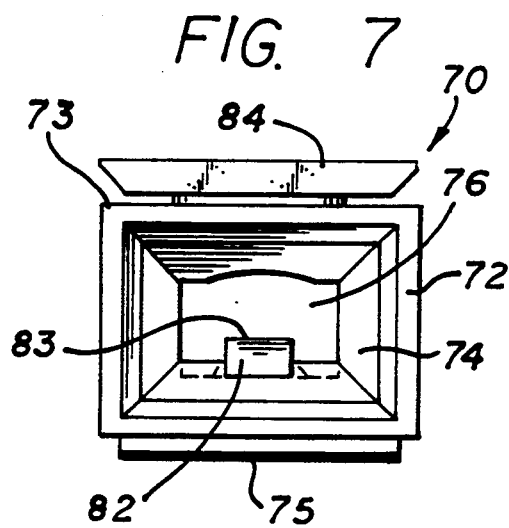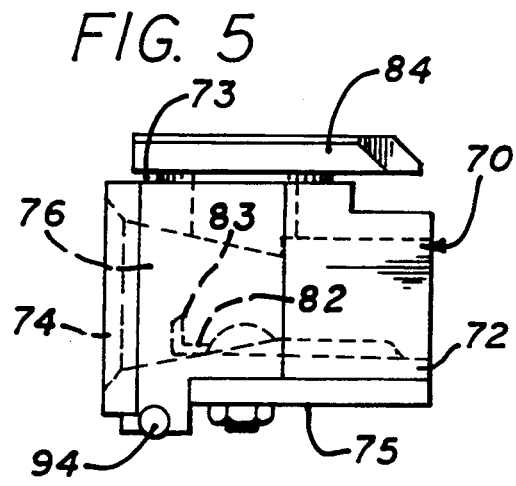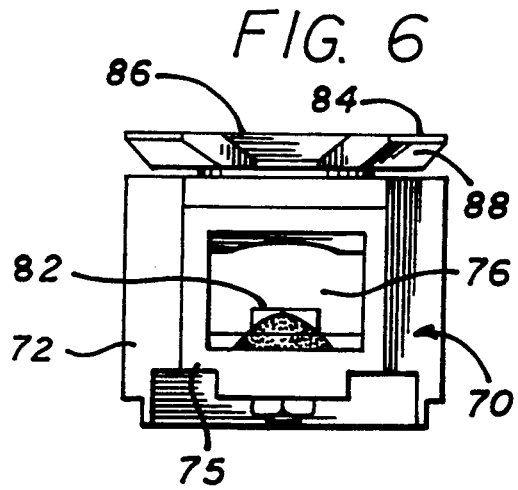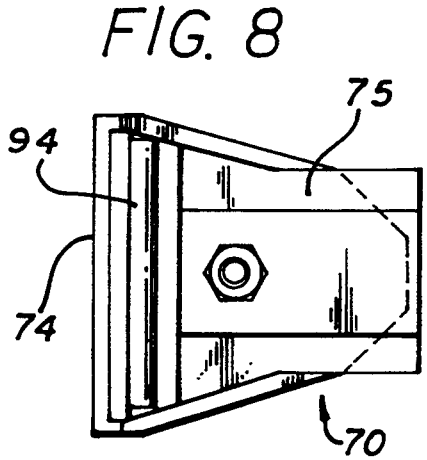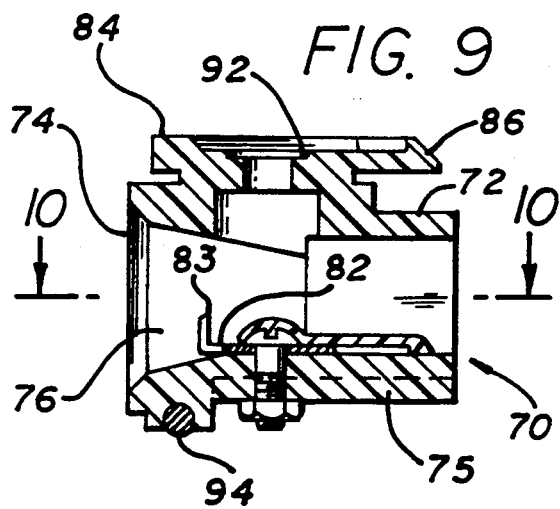

UNIVERSAL ADAPTER FOR NIGHT VISION SYSTEM

BACKGROUND OF THE INVENTION

1. Related Applications

The present invention relates to and incorporates by reference the teachings of the following co-pending patent application: IMPROVED NIGHT VISION SYSTEM AND MOUNTING ASSEMBLY, Ser. No. 07/805,187, filed Dec. 10, 1991, by Dor.

2. Field of the Invention

The present invention relates to a night vision system, and more particularly, to a universal adapter which enables a single face mask or helmet mount to be used in conjunction with either of two commercially available night vision goggles.

3. Description of Related Art

Night vision systems are commonly used by military and law enforcement personnel for conducting operations in low light or night conditions. These systems intensify the ambient light to produce an output image which is visible to the human eye. Such night vision systems either take the form of binoculars, having separate eye pieces for each eye, or monoculars, having only a single eye piece.

It is common for operators of night vision systems to desire hands free operation, in which the binocular or monocular systems can be mounted to either a face mask worn on the operator's face, or to the operator's helmet. The typical face mask mounting assembly comprises a rod which is held to the operator's face by use of a strap which wraps around the head and connects to the rod at two or more places. At the center of the forehead portion of the rod, a mount is provided which would engage the binocular or monocular system. Helmet mounting assemblies are also available, in which the bar mounts directly to the operator's helmet. A helmet mounting assembly of this kind is disclosed in the copending application described above. The components comprising a face mask or helmet mounting system are referred to collectively as headgear.

Currently, the night vision system art is dominated by two distinct goggle configurations. The first configuration is designated as the AN/PVS-7A by the United States government, manufactured by Litton Systems, Inc., the assignee of the present case, and the second configuration is designated as the AN/PVS-7B, manufactured by VARO, Inc. Both the AN/PVS-7A and the AN/PVS-7B utilize a binocular format, having two eye pieces which combine to a single scope. The AN/PVS-7A night vision system is show in FIG. 1, and the AN/PVS7B night vision system is shown in FIG. 2. Many of the design features, capabilities and operational characteristics of the two goggle configurations are similar.

The primary distinction between the two configurations lies in the method of attachment of the goggle to the headgear. In the AN/PVS-7A configuration, a dovetail shaped plate is configured to secure within a moveable carriage which mounts to the helmet or face mask secured bar. The plate locks within the carriage by use of a locking mechanism within the carriage, and is released by manual operation of button provided with the carriage.

In contrast, the AN/PVS-7B night vision goggle utilizes a generally rectangular plug which engages an associated socket provided on the headgear. The plug and socket combination for the AN/PVS-7B night vision goggle is disclosed in U.S. Pat. No. 4,697,783, by Kastendieck et al. Unlike the carriage described above, the socket is relatively inert, having no moving parts. A spring biased hook is provided with the plug which catches a stationary flange member within the socket. To release the plug from engagement with the socket, a lever arm extending from the hook is manually depressed, releasing the hook from the engagement with the flange member. The plug is located closer to the optical line of sight than the dovetail plate described above, and the headgear of the AN/PVS-7A goggle positions the carriage higher on the operator's forehead relative the socket for the AN/PVS-7B configuration.

It should be apparent that the AN/PVS-7A night vision goggles can only be used with its associated headgear, and the AN/PVS-7B can only be used with its associated headgear. This presents a problem for many users of the night vision goggles. Many such users purchase both types of night vision goggles, depending upon availability and price of the respective systems. Unfortunately, the two systems are not interchangeable in that one type of goggle cannot be used with a different type of headgear. Interchangeability is important in that it expands the total number of night vision systems available to the operators.

Thus, it would be desirable to provide an adapter which enables interchangeability between the two common forms of night vision system. It would be further desirable to provide an adapter for a night vision mounting assembly having a plate receiving carriage-type receptacle, in which the adapter can receive a goggle having a plug-type mount. It would be further desirable to provide an adapter for a night vision goggle which is relatively inexpensive, light weight, and simple to manufacture.

SUMMARY OF THE INVENTION

Accordingly, a principal object of the present invention is to provide an adapter for a night vision system which enables the use of either a goggle having a plug-type mounting connector or a plate type mounting connector, with a single type of headgear, so as to enhance the interchangeability of these systems.

Another object of the present invention is to provide an adapter for a night vision goggle which is relatively inexpensive, light weight, and simple to manufacture.

To achieve the foregoing objects and in accordance with the purpose of the invention, an adapter is provided which enables the use of a night vision goggle having plug-type mounting connector and a spring biased latch, with a head mounting assembly having a plate-type receiving carriage- The adapter comprises a housing having a plug-type receptacle configured to receive the plug-type mounting connector and an internal bar capable of engaging the latch. The adapter further comprises a dovetail type mounting plate which is integrally formed to the housing and configured to engage the plate-type receiving carriage. The plug-type receptacle further comprises a generally rectangular cavity having an outwardly flared entrance portion. The adapter can be formed from a light weight, easy to construct material, such as high impact plastic.

In an alternative embodiment of the present invention, a night vision system is provided which comprises a goggle portion and a head mounting portion. One of the portions have a plug-type mounting assembly and the other of the portions have a plate-type mounting assembly. An adapter is provided for enabling attachment of the goggle to the head mounting portion. The adapter comprises a housing having a receptacle configured to receive the mounting assembly of the goggle portion, and a connector integrally formed to the housing and configured to engage the mounting assembly of the head mounting portion. The connector is capable of selective disengagement from the receptacle.

A more complete understanding of the adapter for a night vision system of the present invention will be afforded to those skilled in the art, as well as a realization of additional advantages and objects thereof, by a consideration of the following detailed description of the preferred embodiment. Reference will be made to the appended sheets of drawings which will be first described briefly.

BRIEF DESCRIPTION OF THE DRAWINGS

FIG. 4 is a top view of the adapter;

FIG. 5 is a side view of the adapter;

FIG. 6 is a rear view of the adapter;

FIG. 7 is a front view of the adapter;

FIG. 8 is a bottom view of the adapter;

FIG. 9 is a cross-sectional view of the adapter, as taken through the section 9—9 of FIG. 4;

DESCRIPTION OF THE PREFERRED EMBODIMENTS

Figure 1:
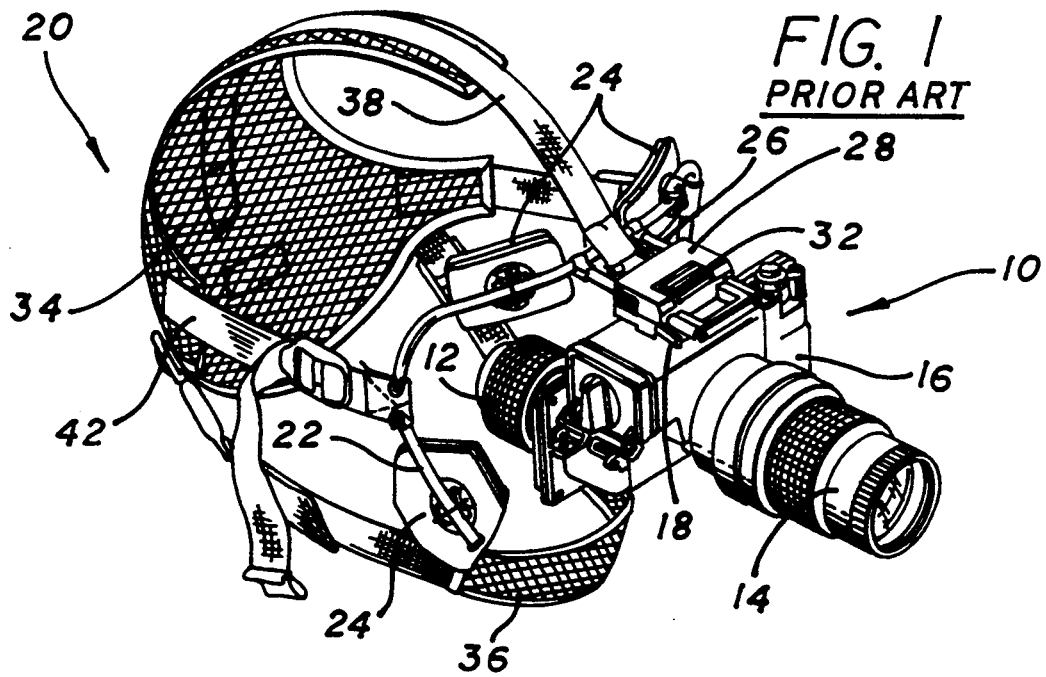
FIG. 1 shows the AN/PVS-7A night vision goggles secured to a face mask type mounting assembly.
Figure 3:
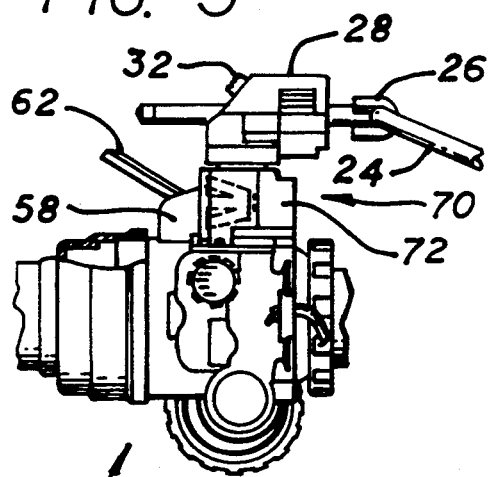
FIG. 3 shows the AN/PVS-7B night vision goggles secured to a head mounting assembly having a plate-type receiving carriage and an adapter of the present invention.

Two of the more common forms of night vision systems are the AN/PVS-7A and the AN/PVS-7B. The AN/PVS-7A is shown generally at 10 of FIG. 1 secured to a face mask type mounting assembly 20. The AN/PVS-7A generally comprises a center housing portion 16 having an objective lens 14 extending outwardly, and eye pieces 12 facing the operator. As known in the art, light entering the objective lens 14 is amplified by use of a internal image intensification tube, producing an image which can be seen through the eye pieces 12.

The AN/PVS-7A secures to the face mask 20 by cooperation between a mounting plate 18 and an associated receiving carriage 28. The receiving carriage 28 is adjustable to optimize the distance between the eye piece 12 and the operator. The face mask 20 comprises a curved rod 22 which partially encircles the operator's face and a skull cap 34 which connects to the rod and surrounds the back of the operator's head. The rod 22 has several cushion plates 24 which contact various points on the operator's face, so as to provide a more stable platform for the goggles. The receiving carriage 28 is provided at a center mount portion 26, and is adjustable relative the center portion as described above. The skull cap 34 has a top strap 38, a pair of side straps 42 and a chin strap 36 which further secure the night vision system to the operator's head.

Figure 2:
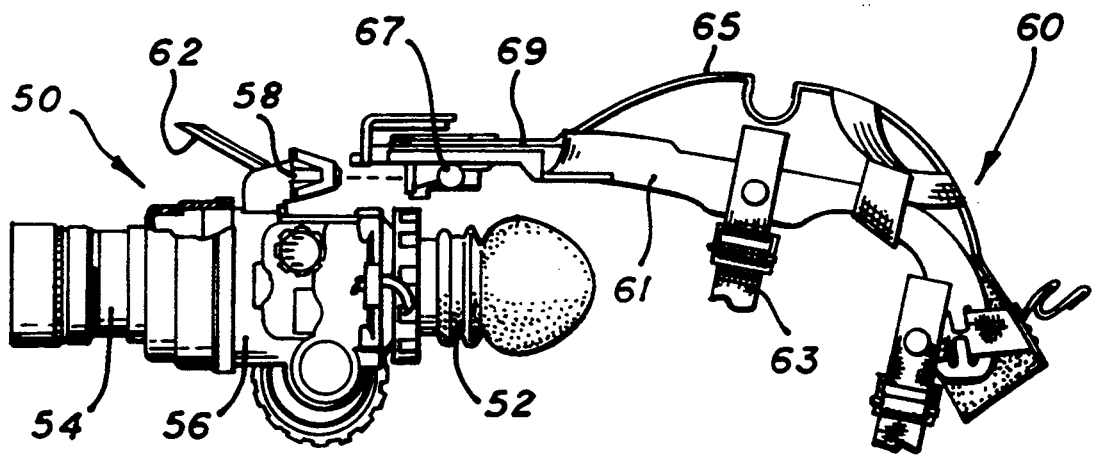
FIG. 2 shows the AN/PVS-7B night vision goggles secured to a face mask type mounting assembly.

The AN/PVS-7B night vision system is shown generally at 50 of FIG. 2. Like the other system, it has a housing portion 56 with an objective lens 54 extending outwardly therefrom, and a pair of eye pieces 52. The internal operation of the AN/PVS-7B is substantially similar to that of the AN/PVS-7A. However, the AN/PVS-7B has a different mounting scheme from that of the AN/PVS-7A. Secured to the housing portion 56 is a plug-type connector 58. The connector is generally rectangular and has a shape similar to an arrowhead. A spring biased lever 62 extends outwardly from the connector 58, which joins to a latch 68. The lever 62 and latch 68 cooperate to secure the plug 58 within its associated receptacle, as will be further described below.

The AN/PVS-7B also has an associated headgear 60 which allows the night vision system to be secured to the operator's head. The headgear 60 has a head band 61 which wraps around the head and secures by the use of side straps 63. Extending outwardly from the front of the head band 61 is a support bracket 65 which has a receptacle 67 configured to receive the plug 58. Unlike the receiving carriage 28 of the AN/PVS-7A headgear, the receptacle 67 is generally inert. The locking and release mechanism to secure the plug 58 within the receptacle is provided with the plug 58, rather than with the receptacle 67. When the plug 58 is inserted into the receptacle, it snaps into place by cooperation between the latch 68 and an internal hook provided in the receptacle 67. To remove the plug 58 from the receptacle, the lever 62 is depressed which releases the latch 68 from engagement with the hook within the receptacle 67.

It should be apparent that although the two systems are very similar, they are not interchangeable. Specifically, the mounting plate 18 of the AN/PVS-7A night vision system 10 cannot be made to secure with the receptacle 67 of the headgear 60. Conversely, the mounting plug 58 of the AN/PVS-7B night vision system 50 cannot be made to secure with the receiving carriage 28 of the headgear 20. Such interchangeability would be desirable so as to improve the availability of night vision systems to the operator. For example, the choice of headgear often depends on the individual operator's comfort. Although either the headgear 20 or headgear 60 can be made to fit a particular operator, it often takes a period of time to adjust all the straps so as to provide a perfect fit. Once such a fit is achieved, it is unlikely that an operator would chose to remove the headgear and replace it with the alternative headgear if there has been a failure to the associated night vision system. Thus, the present invention enables a single type of headgear to be used with either of the aforementioned night vision systems.

Figure 10:
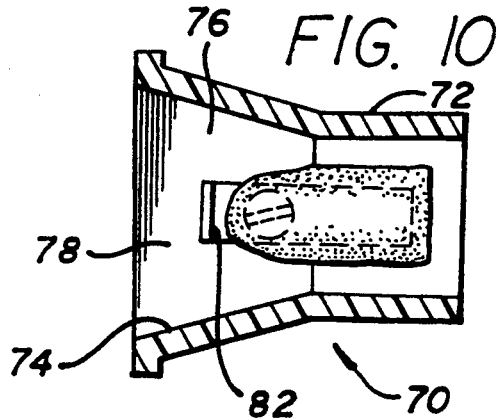
FIG. 10 is a cross-sectional view of the adapter, as taken through the section 10—10 of FIG. 9.

To achieve this interchangeability, an adapter 70 is provided. The adapter 70 comprises a generally rectangular housing 72 with a flared opening 74. The opening 74 leads to an internal cavity 76 which is configured to receive the mounting plug 58 of the AN/PVS-7B night vision system 50. At a bottom surface 78 of the internal cavity 76, a hook 82 is secured in place. The hook 82 can be secured by any known fastening method, such as by a bolt or epoxy. FIGS. 9 and 10 show the use of both such methods, wherein the hook 82 has been bolted to the bottom surface 78 with a layer of epoxy applied over the bolt and a portion of the bottom surface 78.

Figure 11:
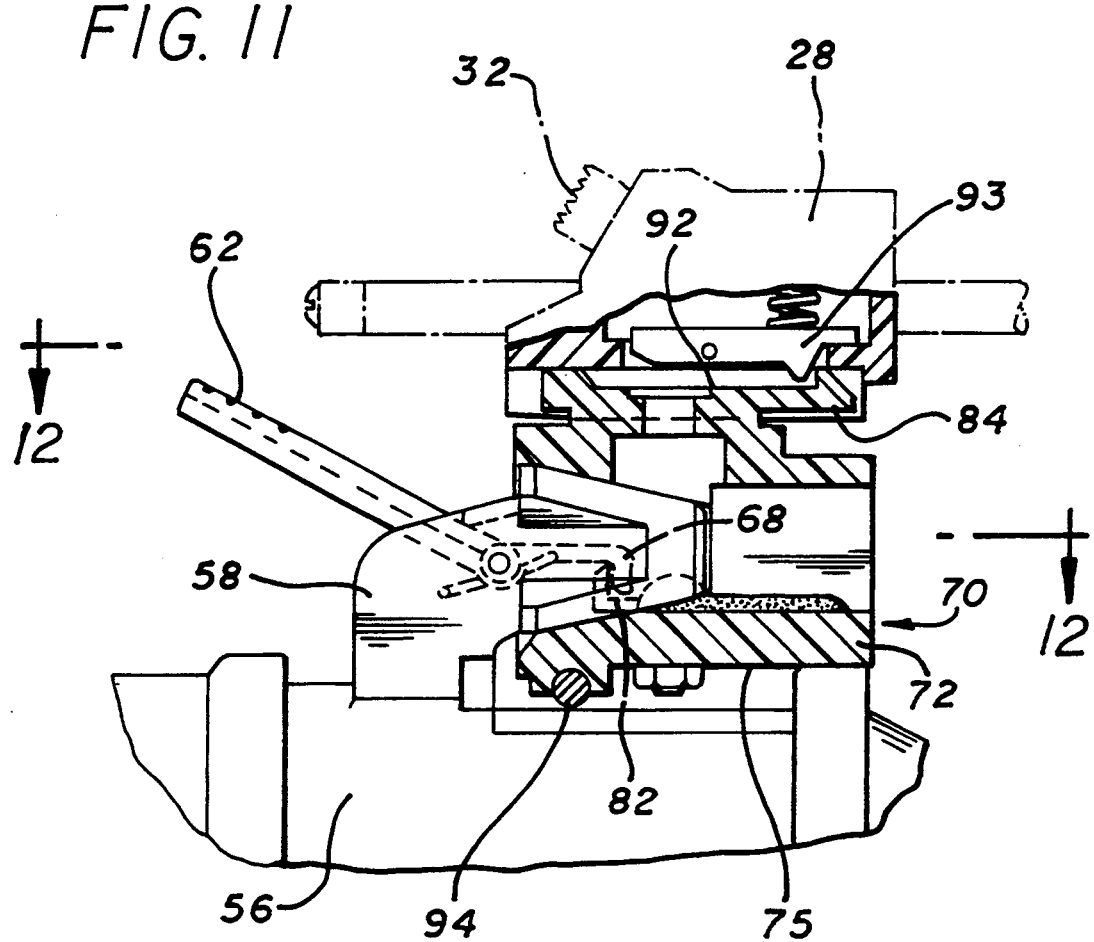
FIG. 11 is a partial cut-away view of the adapter secured to the head mounting assembly having a plate-type receiving carriage and the AN/PVS-7B night vision goggles.
Figure 12:
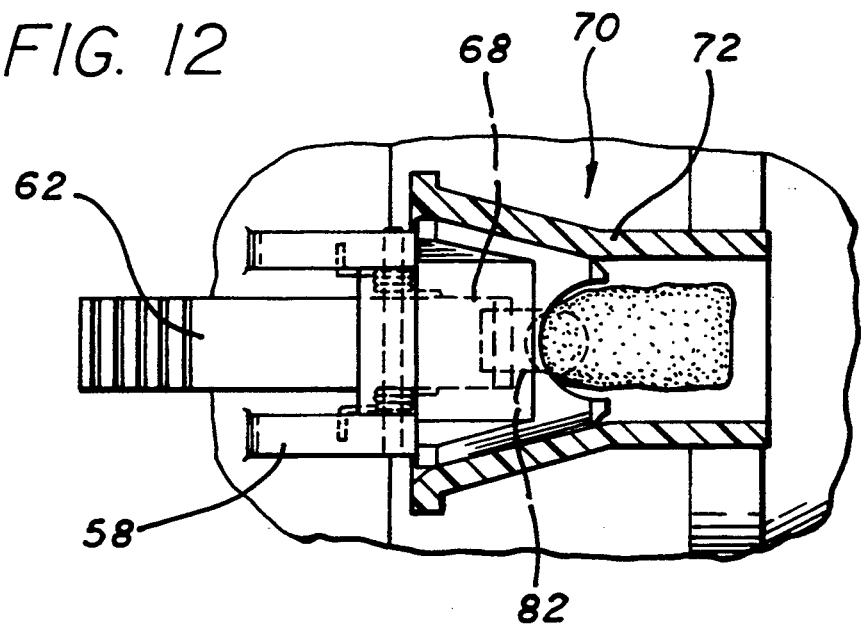
FIG. 12 is a partial cross-sectional view of the adapter secured to the AN/PVS-7B night vision goggles, as taken through the section 12—12 of FIG. 11.

As shown in FIGS. 11 and 12, the latch 68 engages the hook 82 by snapping over a bevelled surface 83 provided on a facing portion of the hook 82. Once the plug 58 has been fully inserted into the receptacle 67, the latch secures behind the hook 82 to firmly hold the plug 58 in place. To release the plug 58, the operator depresses the lever 62 against its internal spring bias which lifts the latch 68 relative the hook 82, enabling the plug 58 to be readily removed from the receptacle 67.

At an upper portion 73 of the housing 72, a mounting plate 84 is provided, best shown in FIGS. 4 through 9. The mounting plate 84 is substantially identical to that normally provided on the AN/PVS-7A night vision system described above. The mounting plate 84 has a dovetail shape, with a leading edge 86 and a pair of diverging side edges 88. These edges are configured to readily insert into the receiving carriage 28. Generally centered within the plate 84 is a depressed portion 92. The depressed portion 92 is configured to receive a locking finger 93 which depends from an internal portion of the receiving carriage 28. The locking finger 93 pivots out of the depressed portion 92 by manually pushing the release bottom 32.

At a lower portion 75 of the housing 72, a rod magnet 94 is provided. The magnet 94 is intended to interact with an internal reed switch provided within the AN/PVS-7B night vision system. As known in the art, the reed switch provides a fail safe mechanism to insure that the power to the night vision system is removed once the goggle has been disengaged from the headgear. This feature insures that the power is not left on after the system has been removed from use, which would run the battery down prematurely, and could create a security threat due to enemy observers seeing the light emitted from the eyepiece 12.

It is anticipated that the adapter 70 be formed of a light weight, rigid material, such as plastic or metal. The mounting plate 84 is integrally formed to the housing 72, and the two components can be either formed from a single piece, or manufactured separately and combined together.

Having thus described a preferred embodiment of an adapter for a night vision system mounting assembly, it should now be apparent to those skilled in the art that the aforestated objects and advantages for the within system have been achieved. It should also be appreciated to those skilled in the art that various modifications, adaptations and alternative embodiments thereof may be made within the scope and spirit of the present invention. For example, even though the figures show the adapter used with a facemask type of headgear, it is anticipated that it be advantageously used with a helmet mount type of headgear, as disclosed in the above identified related application.

The present invention is further defined by the following claims:

What is claimed is:

1. An adapter for enabling use of a night vision goggle having a plug-type mounting connector and a spring biased latch, with a head mounting assembly having a plate-type receiving carriage, said adapter comprising:
   a housing having a plug-type receptacle configured to receive said plug-type mounting connector and a bar capable of engaging said latch; and
   a plate-type mounting plate integrally formed to said housing and configured to engage said plate-type receiving carriage;
   wherein said plug-type mounting connector is secured within said plug-type receptacle by engagement between said latch and said bar.

2. The adapter of claim 1, wherein said plug-type receptacle comprises a generally rectangular cavity having an outwardly flared entrance portion.

3. The adapter of claim 2, wherein said bar is secured within said cavity at a lower portion thereof.

4. The adapter of claim 3, wherein said plug-type mounting connector is capable of selective disengagement from said plug-type receptacle by manual manipulation of said latch of said night vision goggle so that said bar is disengaged by said latch.

5. The adapter of claim 1, wherein said mounting plate has a dovetail shape.

6. An adapter for enabling use of a night vision goggle having a plug-type mounting connector with a head mounting assembly having a plate-type receiving carriage, said adapter comprising:
   a housing having a plug-type receptacle configured to receive said plug-type mounting connector; and
   a mounting plate integrally formed to said housing and configured to engage said plate-type receiving carriage.

7. The adapter of claim 6, further comprising:
   a means for securing said plug-type mounting connector within said plug-type receptacle.

8. The adapter of claim 7, wherein said securing means further comprises:
   a bar within said plug-type mounting receptacle and capable of being engaged by a spring-loaded latch of said mounting connector.

9. The adapter of claim 8, wherein said bar is disposed within said housing.

10. The adapter of claim 9, wherein said plug-type receptacle comprises a generally rectangular cavity having an outwardly flared entrance portion.

11. The adapter of claim 10, wherein said mounting plate has a dovetail shape.

12. A night vision system, comprising:
   a goggle portion having a plug-type mounting connector and a spring biased latch;
   a head mounting assembly having a plate-type receiving carriage; and
   an adapter means for enabling attachment of said goggle portion to said head mounting assembly, said adapter means comprising a housing having a plug-type receptacle means configured to receive said plug-type mounting connector, a bar capable of engaging said latch, and a mounting plate integrally formed to said housing and configured to engage said plate-type receiving carriage.

13. The night vision system of claim 12, wherein said plug-type mounting connector is secured within said plug-type receptacle by engagement between said latch and said bar.

14. The night vision system of claim 13, wherein said plug-type mounting connector is capable of selective disengagement from said plug-type receptacle by manual manipulation of said latch.

15. The night vision system of claim 14, wherein said plug-type receptacle comprises a generally rectangular cavity having an outwardly flared entrance portion.

16. A night vision system, comprising:

a goggle portion and a head mounting portion, said goggle portion having a plug-type mounting assembly, and said head mounting portion having a plate-type mounting assembly; and an adapter for enabling attachment of said goggle portion to said head mounting portion, said adapter comprising a housing having a receptacle configured to receive said plug-type mounting assembly of said goggle portion and a connector integrally formed to said housing and configured to engage said plate-type mounting assembly of said head mounting portion.

17. The night vision system of claim 16, wherein said housing is configured so that said plug-type mounting assembly is capable of selective disengagement from said receptacle.

* * * * *